US009860138B2

(12) United States Patent
Khargharia et al.

(10) Patent No.: US 9,860,138 B2
(45) Date of Patent: Jan. 2, 2018

(54) BANDWIDTH ON DEMAND IN SDN NETWORKS

(71) Applicant: Extreme Networks, Inc., San Jose, CA (US)

(72) Inventors: Bithika Khargharia, Durham, NC (US); Jacob A. Howering, Raleigh, NC (US); Wilson Y. Lai, Raleigh, NC (US)

(73) Assignee: Extreme Networks, Inc., San Jose, CA (US)

( * ) Notice: Subject to any disclaimer, the term of this patent is extended or adjusted under 35 U.S.C. 154(b) by 25 days.

(21) Appl. No.: 14/784,020

(22) PCT Filed: Apr. 14, 2014

(86) PCT No.: PCT/US2014/034049
§ 371 (c)(1),
(2) Date: Oct. 12, 2015

(87) PCT Pub. No.: WO2014/169289
PCT Pub. Date: Oct. 16, 2014

(65) Prior Publication Data
US 2016/0065422 A1    Mar. 3, 2016

Related U.S. Application Data

(60) Provisional application No. 61/811,652, filed on Apr. 12, 2013.

(51) Int. Cl.
*H04L 12/24*    (2006.01)
*H04L 12/729*    (2013.01)
(Continued)

(52) U.S. Cl.
CPC ...... *H04L 41/5051* (2013.01); *H04L 41/0896* (2013.01); *H04L 41/5054* (2013.01);
(Continued)

(58) Field of Classification Search
CPC ............. H04L 41/0896; H04L 41/5051; H04L 41/5054; H04L 45/125; H04L 45/30;
(Continued)

(56) References Cited

U.S. PATENT DOCUMENTS

| 9,444,712 B2 * | 9/2016 | Ali ...................... H04L 41/0896 |
| 2011/0310736 A1 * | 12/2011 | Dighe ................... H04L 12/462 370/235 |

(Continued)

OTHER PUBLICATIONS

Pan, Ping et al. "Software Defined Network (SDN) Use Care Ffor Bandwidth on Deman Applciations" pp. 1-11.*

(Continued)

*Primary Examiner* — Afsar M Qureshi
(74) *Attorney, Agent, or Firm* — Haley Guiliano LLP

(57) ABSTRACT

Bandwidth-on-Demand (BoD) as a network service (BoD-as-a-Service) is integrated into applications that end-users can flexibly purchase when and for however long they need it. A centralized Software Defined Networking (SDN) controller and distributed SDN controller agents that may be seen in a Service Provider, Enterprise or distributed computing environment with remote and mobile end-users is provided. The end-user initiates the BoD request using an application via desktop, cloud, smartphone or tablet. The BoD Service Provider, Enterprise, has a controller-based centralized view of the complete SDN service topology. On receiving the request, the BoD provider dynamically computes the optimal end-to-end path through the SDN topology that best suits the end-user requested traffic types and service level requirements. It then translates that optimal path into flow computations that are dynamically pushed down to the controller agents to provision the BoD network path in real-time. An on-demand and real-time bandwidth service for consumers are herein provided where it was previously too costly or too time consuming to set up.

7 Claims, 4 Drawing Sheets

(51) Int. Cl.
  *H04L 12/715* (2013.01)
  *H04L 12/717* (2013.01)
  *H04L 12/911* (2013.01)
  *H04L 12/725* (2013.01)
  *H04L 12/865* (2013.01)
  *H04L 12/863* (2013.01)
  *H04L 12/721* (2013.01)
  *H04L 12/927* (2013.01)

(52) U.S. Cl.
  CPC ............ *H04L 45/125* (2013.01); *H04L 45/30* (2013.01); *H04L 45/38* (2013.01); *H04L 45/42* (2013.01); *H04L 45/64* (2013.01); *H04L 47/6215* (2013.01); *H04L 47/6275* (2013.01); *H04L 47/781* (2013.01); *H04L 47/805* (2013.01)

(58) Field of Classification Search
  CPC ......... H04L 45/38; H04L 45/42; H04L 45/64; H04L 47/6215; H04L 47/6275; H04L 47/781; H04L 47/805
  USPC .......................................................... 370/412
  See application file for complete search history.

(56) References Cited

U.S. PATENT DOCUMENTS

| | | | |
|---|---|---|---|
| 2012/0250684 A1* | 10/2012 | Ogura | H04L 12/4625 370/390 |
| 2012/0269053 A1 | 10/2012 | Yu et al. | |
| 2014/0241717 A1* | 8/2014 | Cvijetic | H04Q 11/0067 398/48 |
| 2016/0050470 A1* | 2/2016 | Swinkels | H04Q 11/0062 398/45 |

OTHER PUBLICATIONS

International Preliminary Report on Patentability for International Patent Application No. PCT/US2014/034049, dated Oct. 22, 2015.
International Search Report and Written Opinion for International Patent Application No. PCT/US2014/034049, dated Jul. 17, 2014.
Pan, Ping et al., "Software Defined Network (SDN) Use Care for Bandwidth on Demand Applications," Internet Engineering Task Force, draft-pan-sdn-bod-problem-statement-and-us-e-case-01. txt, (2011), pp. 1-11.
"OpenFlow Switch Specification v1.3.1," Sep. 6, 2012, Retrieved from the Internet: URL: https://www.opennetworking.org/images/stories/downloads/sdn-resources/onf-specifications/openflow/openflow-spec-v1.3.1.pdf.

* cited by examiner

```
{
"src-ID": "",
"dst-ID": "",
"service tier": "platinum",
"time-duration": {
        "unit": "minutes",
        "time": "15",
    }
}
```

FIG. 4

United States Patent US 9,860,138 B2

BANDWIDTH ON DEMAND IN SDN NETWORKS

CROSS-REFERENCE TO RELATED APPLICATIONS

This application is the U.S. National Phase Application of PCT International Application No. PCT/US2014/034049, filed Apr. 14, 2014, and claims the benefit of U.S. Provisional Patent Application No. 61/811,652, filed Apr. 12, 2013, the disclosures of both of which are incorporated herein by reference in their entireties.

TECHNICAL FIELD

Embodiments of the present invention relate to a data communications network. In particular, embodiments of the present invention relate to an end user dynamically requesting, on-demand, a service-defined end-to-end network session, or a Bandwidth-on-Demand (BoD) flow, to a target recipient for a dynamic or defined time period.

BACKGROUND ART

Prior to Software-Defined Networking (SDN) enabled technologies, network service providers offered bandwidth services as pre-defined packages of levels of service. In a typical scenario 100 illustrated in FIG. 1, internetwork 105 comprises a number of interconnected switches 110-130. End users 140 and 150 connect from their user home network to a switch at the edge of internetwork 105 via respective links 135 and 145. Each end user is only offered services to increase or decrease bandwidth over the link from the user home network to the service provider network. Users have no ability to order guaranteed end-to-end connection service with other users. Even if, in the example 100 scenario illustrated in FIG. 1, both users 140 and 150 increased their user home network to internet connection (135, 145) bandwidth to the maximum possible, the service provider network 105 still provides only best effort services. Even if the network service provider wanted to offer such ad hoc on-demand bandwidth services, the effort and time required to provision such between two users far surpasses the users' or the provider's willingness to spend such time and effort.

With SDN, and with the BoD concepts described below according to embodiments of the invention, the network service provider has the ability to offer, as an additional overlay, BoD services to users who want or require guaranteed services, such as remote diagnosis needs, or who simply require a guaranteed highly quality video call with a remote client, for example. The BoD approach allows the network service provider to control the interswitch connections 151-155 illustrated in FIG. 1 with SDN technologies to provide a real-time and on-demand end-to-end connection.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 4 illustrates an embodiment of the present invention.

DESCRIPTION OF THE EMBODIMENTS

Embodiments of the invention, referred to herein as Bandwidth on Demand (BoD), is a network service offering (BoD-as-a-Service), hosted by network service providers or corporate enterprise networks targeting end-user consumers. BoD enables static, or mobile, end-users to dynamically request on-demand a service defined end-to-end network session, termed herein as a BoD Flow, to a target recipient for a dynamic or defined time period. The BoD Flow may include audio, video, or chat communications, or variations of all of the above, commonly referred to as Unified Communications (UC). The BoD Flow, including signaling, flow setup, flow state maintenance, and BoD Flow tear-down, uses the well-known OpenFlow specification promoted by the Open Network Foundation as the underlying BoD control protocol.

Providing bandwidth or guaranteed bandwidth services is a common and typical network service offering of both network service providers and corporate enterprise networks for their service offerings. The bandwidth service offering can include many different forms based on the capabilities of the offer itself, or the desired needs and market requirements by end users. Bandwidth service offerings include:

Dedicated and Guaranteed Bandwidth based on Network Connectivity

Bandwidth Guarantees with Burst capabilities

Minimum Bandwidth Guarantee with Best Effort

Best Effort on demand

Figure 1:
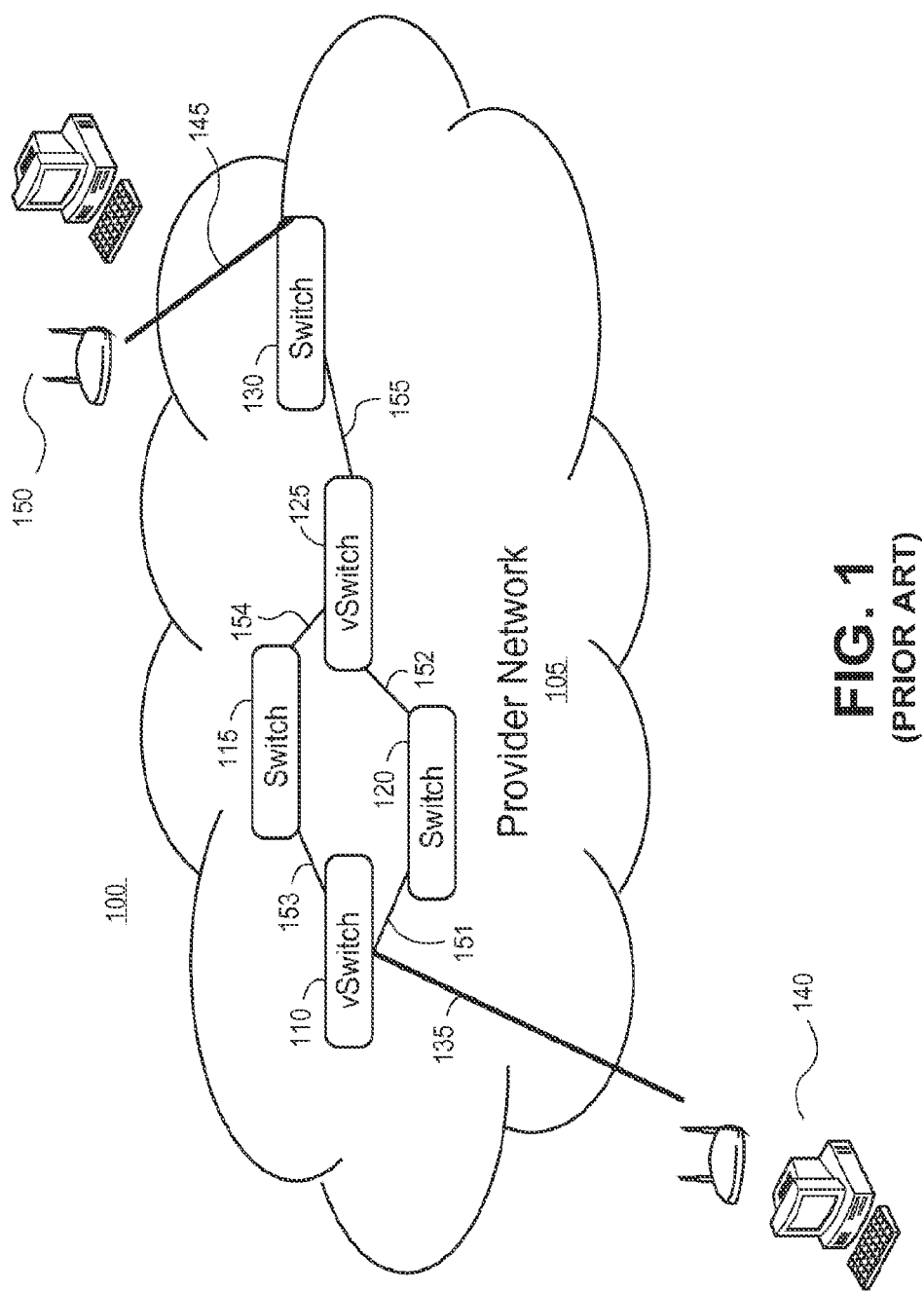
FIG. 1 illustrates a prior art data communications network.
Figure 2:
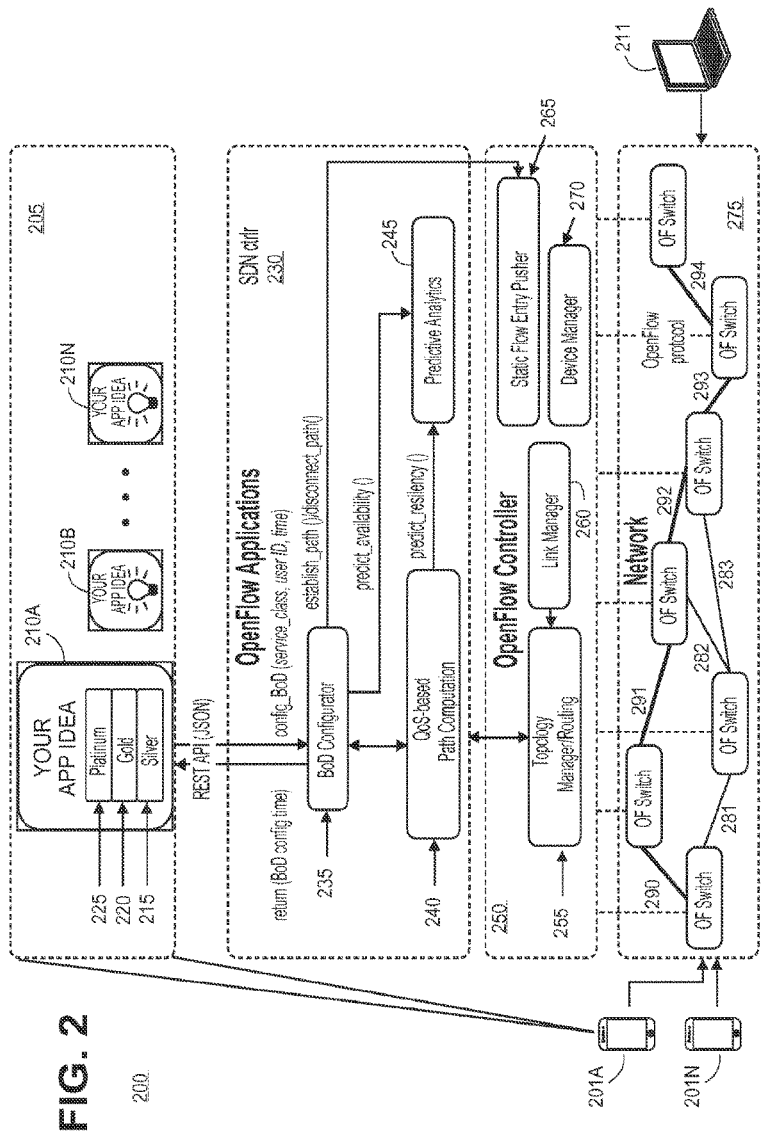
FIG. 2 illustrates an embodiment of the present invention.

FIG. 2 provides is a high-level diagram 200 illustrating embodiments of the invention. Embodiments of the invention provide a mechanism for smart phones 201a through 201n and/or web applications 210a through 210n created by web application developers to offer a multi-tier BoD-as-a-Service that the end-users of the application can buy when they need it and for how long they need it. Within the application 210, BoD-as-a-Service will be an upgradable option from the default bandwidth option that is provided by a carrier today. For example, BoD service may be upgraded to "silver" as depicted at 215, "gold" as depicted at 220, or "platinum" as depicted at 225. Any application that has a need for high-bandwidth for a limited time period is a candidate for using BoD-as-a-Service. Typical examples of such applications may be Tele-Medicine, Online Counseling, and Online Education etc. As is illustrated in FIG. 2, the different levels of service, depicted as "platinum", "gold" and "silver", may be integrated into an end user application that runs on a smart phone (201a through 201n), tablet (not shown), laptop 211, or desktop computing device (not shown). The application that integrates such functionality uses information from a SDN controller (illustrated by the dashed line 230 around OpenFlow Applications 235-245 in FIG. 2) to program the network. SDN allows network administrators to have programmable central control of network traffic via a controller without requiring physical access to the network's switches. The SDN controller has a global view of the physical topology and state of the network at any given point in time.

SDN requires some method for the control plane (implemented in SDN controller 230) to communicate with a data plane 275 (the underlying systems and switches that forward traffic to selected destinations). One such mechanism, further with reference to FIG. 2, is an OpenFlow Controller comprising components 255-270, illustrated by the dashed line 250, that may be implemented in the network operating system of a network switch, in one embodiment. OpenFlow (OF) switches illustrated in the bottom tier 275 of FIG. 2 each include an SDN agent that communicates with the various subcomponents 255-270 illustrated in the OpenFlow Controller 250 in the next higher tier in FIG. 2 via, for example, the OpenFlow protocol. While all of the switches are physically connected to at least one other switch as illustrated by the various links 281-294 in the bottom tier of FIG. 2, the switches with links 290-294 between them are intended to indicate programmed connections according to embodiments of the invention.

Figure 3:
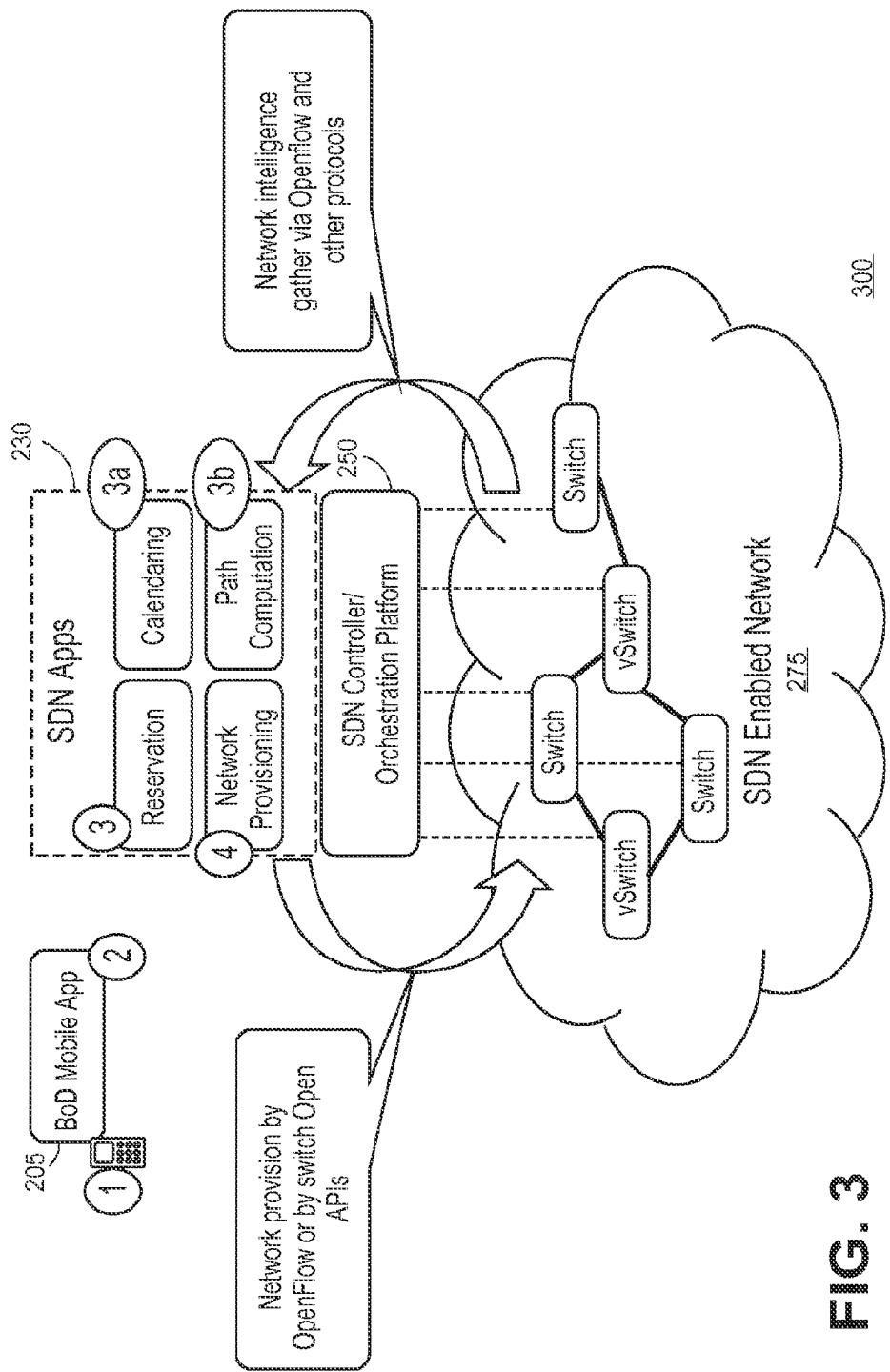
FIG. 3 illustrates an embodiment of the present invention.

FIG. 3 illustrates the process to provision BoD according to embodiments of the invention 300, wherein the reference numbers 1, 2, 3, 3a, 3b and 4 provided in FIG. 3 point out the component or location in the network where the corresponding functionality is described in the numbered paragraphs below:

1. BoD-tier Request. An end user requests a BoD service tier (e.g., silver, gold, or platinum) via a mobile app 205 that has the service integrated into it. In one embodiment of the invention, the end user accesses this service by keying in two key pieces of information—1) BoD service tier and 2) time duration for the service.

2. BoD-tier Request Communication. In one embodiment of the invention, this information provided by the end user is encoded into a Java-Script Oriented Notation (JSON) object and communicated via a Representational State Transfer (REST) call into the network service provider of this BoD service referred to as the BoD Configurator 235 in FIG. 2.

An example REST API call is shown below.

http://<controller_ip>:8080/BoD/json

FIG. 4 shows an example JSON object 400 where the end-user selects a high level of service, e.g., the "platinum" BoD tier, for a period of time, such as 15 minutes. In one embodiment, the end-user also specifies the two end-points of the path on which BoD has been requested. These fields are identified by the "src-ID" and "dst-ID" fields in the JSON object.

3. BoD Reservation. The SDN controller 230 receives the BoD request and performs the BoD reservation logic, as follows:
 a) If reservation is for future time, the bandwidth is reserved via a calendaring and average usage method.
 b) If bandwidth request is immediate, that is, if the end user wants service now, then perform path computation logic.
  Assumptions:
   Both caller and receiver are on the same SDN network.
   Caller and receiver have been translated into end-points in the network.
   The SDN Controller regularly obtains and stores the following network information that is used for the path computation:
    i) Network Topology & State (e.g. Link UP/Down etc.) . . . (I)
    ii) Hop-to-Hop Latency . . . (II)
    iii) Available Bandwidth per Hardware Queue per Port per Hop . . . (III)
  Path Ranking. A primary task of the BoD algorithm according to an embodiment of the invention is to map a BoD tier to an optimal path and optimal route queue, $R_{opt}$, in the topology as quickly as it can. In doing so, the assumption is made that BoD is a network service more popular with voice/video applications. Such applications are characteristically sensitive to latency (inter-packet delay) and jitter (variation in inter-packet delay). For such applications, in one embodiment, one of the most important Quality of Service (QoS) parameters to establish is minimum bandwidth (higher for video than voice), followed by priority. To provision such an embodiment of the invention leverages hardware queuing at the switch. In one embodiment a network switch operating system supports multiple hardware queues per port, for example, 8 queues, wherein, in one embodiment, the queues are numbered from QP1 to QP8 the smallest number being the highest priority. Each queue can be configured with different QoS parameters, in one embodiment. As discussed above, in one embodiment, the most critical QoS parameter is the minimum bandwidth per queue, that is, the guaranteed bandwidth that an application will get under worst-case heavily loaded traffic scenarios. In the topology of Open Flow switches, an embodiment will provide for statically configuring the minimum bandwidth (minbw) per queue in a logarithmic scale such that the highest priority queue gets the highest minbw but it rapidly drops as the queue priority drops. In one embodiment, the aggregated minbw cannot exceed 100% of the total bandwidth available on a port. One embodiment further provides for statically configuring a Weighted Fair Queue as the scheduling algorithm to schedule traffic from each queue.

In one embodiment, a greedy approach is adopted to this task, as indicated in the path rank mapping heuristic shown below, meaning that the embodiment will select the best queue it can find in the moment, and if a higher request comes in at a later time, the algorithm deals with such at that subsequent time.

| BoD Tier to Path Rank Mapping Heuristic |
| --- |
| 1. Using (I) determine all possible paths between caller and callee (receiver). |
| 2. Using (II) compute Worst-case Latency per path.<br>$WCLat\|_{path} = MaxLat\|_{hop}$ |
| 3. Rank path based on $WCLat\|_{path}$. Path p with minimum $WCLat\|_{path}$ has the highest rank. Eliminate other paths. |
| 4. Using (III), in p compute the available-bandwidth-per-queue ($avBW\|_q$), all along the path, for each queue.<br>$avBW\|_q = minAvBW\|_{q\ in\ the\ path}$ |
| 5. Rank queues on selected path p based on $avBW\|_q$ using a greedy approach.<br>$R_{opt} = \emptyset$ { $R_{opt}$ is a tuple: path, and rank along path }<br>$avBW\|_{th}$ = configurable {th=threshold, e.g, 20% or less}<br>For (q = QP1; q <= QP8; q++) {what is the right queue in the path}<br>  If ($avBW\|_q <= avBW\|_{th}$)<br>    Continue<br>  Endif<br>  Else<br>    $R_{opt}$ ¯ (p, q) {selected a path and queue > e.g., 20%}<br>    Return $R_{opt}$<br>  Endelse<br>Endfor<br>If $R_{opt} = \emptyset$<br>Enqueue for standard calendering |

4. BoD Provisioning. In one embodiment, the path and queue encapsulated in optimal route ($R_{opt}$) is now translated into OpenFlow flows and pushed into the switches and queues along the path. In one embodiment, this is done via the Static Flow Pusher module 265 also via a REST API call as shown below:

"http://<controller_ip>:8080/wm/staticflowentry-pusher/json"

The JSON object that this call will carry will contain the path $R_{opt}$ information. The JSON object below shows the information for 1 hop in the path p in $R_{opt}$. Note the hard timeout value encoded by the JSON object that is set to 900 seconds or 15 minutes. In one embodiment, the Network Provisioning module (at 4) in FIG. 3 will convert the information encoded in the JSON object to OpenFlow flows and program them via the OpenFlow protocol into the flow tables of the OpenFlow switches along the path in the network. Each flow has a hard timeout, for example, 900 seconds. Consequently, the flows will retire after that time automatically stripping off the path that was earlier provisioned. Also note that the JSON object field "actions" encodes the queue q in $R_{opt}$ on which this traffic is to be forwarded, and in so doing, selects a quality of service.

```
{
    "switch": "00:04:96:6C:F8:3C",
    "name": "of_1",
    "priority": "32768",
    "hard_timeout": 900,
    "src-ip": "10.66.61.13",
    "dst-ip": "10.66.61.12",
    "ether-type": "0x0800",
    "ingress-port": "1",
    "active": "true",
    "actions": "output=2:q"
```

The above example illustrates the programming for one of the hops in the path. It should be noted that each hop in the path has to be programmed in this same manner. In another embodiment, the Controller could also use open APIs on the switches to change/reconfigure minbw per queue, threshold value for available bandwidth avBWIth, and the scheduling algorithm as BoD requests complete directly.

At this point, that BoD-tier has been provisioned and ready to go for the end-user application to start using it. At the end of the reserved time for this BoD, the flows on the path will time-out automatically stripping the path and making it available for future requests.

Note that the SDN Apps inside the dotted line in FIG. 3 are encompassed in the SDN controller/OpenFlow Applications illustrated in FIG. 2, and the SDN Controller/Orchestration Platform is a network operating system level component operating at the OpenFLow Controller tier in FIG. 2. Embodiments of the invention provide a novel approach to buy and sell network bandwidth. The classical approach to buying and selling network bandwidth is preconfigured, fixed and static. Using the embodiments described herein, one can provision network capacity and configure it dynamically based on end-user demand. The end-user pays for just what he/she uses. In essence, embodiments of the invention do to network capacity what Cloud Computing does to compute, memory and storage capacity. While in the traditional Cloud Computing world, networking has evolved as a support fabric that enabled compute, memory and storage on-demand, embodiments of the invention elevate the network to a platform where it directly drives revenue by flexibly selling its most valuable resource—the bandwidth. In addition, embodiments of the invention also enable automatic configuration of the provisioned bandwidth with the right QoS and security capabilities required by the end-user application.

It should be noted that while SDN and simple network management features allow many of the capabilities to change/allocate bandwidth and QoS parameters, the above described embodiments of the invention provide for, importantly, end user-based, or client-based, or client driven, BoD or QoS. Such embodiments allow clients to, for example, configure internet connection speed, or allow a web application for a VoIP conference call to change (e.g., increase) the QoS features, bandwidth, or "dedicated path to server" features, etc. Similarly, all ATM type features are SDN definable features according to an embodiment of the invention.

In summary, embodiments of the invention provide for:
1. Set-up and control, without human intervention, of network provisioning;
2. Client based/driven SDN or BoD/QoS/network services;
3. Application driven SDN/BoD/QoS/network service;
4. Changing client billing and billing to a third party:
   by time, by bandwidth, by application running time, by client set-up, by time of day, bytes sent, bytes received, etc.; and
   by service. For example, suppose a backup service to the cloud defined a dedicated internet path at 2:00 AM and increased inter-access speed by 10× to work quickly and billed the backup service for the "improvement" to the service, and only for the time needed to run. As another example, a video conference service could re-provision on start-up.

In the above description, numerous specific details are set forth. However, it is understood that embodiments of the invention may be practiced without these specific details. In other instances, well-known structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention as discussed above may be implemented as a series of software routines executed by computer system. The software routines may comprise a plurality or series of instructions, code sequences, configuration information, or other data to be accessed and/or executed by a processing system such as one or more processors. Initially, the series of instructions, code sequences, configuration information, or other data may be stored in data storage and transferred to memory via a bus. It is to be appreciated that the series of instructions, code sequences, configuration information, or other data can be stored in a data storage using any conventional computer-readable or machine-accessible storage medium, such as a diskette, CD-ROM, magnetic tape, DVD, ROM, etc. The instructions, code sequences, configuration information, or other data may be copied from the data storage, such as mass storage, and accessed and executed by a processor.

In alternate embodiments, the present invention is implemented in discrete hardware or firmware. For example, one or more application specific integrated circuits (ASICs) could be programmed with some or all of the above-described functions of the present invention.

Accordingly, embodiments of an invention that provision network capacity and configure it dynamically based on end-user demand are described. From the foregoing description, those skilled in the art will recognize that many other variations of the present invention are possible. Thus, the present invention is not limited by the details described. Instead, the present invention can be practiced with modifications and alterations within the spirit and scope of the appended claims.

What is claimed is:

1. In a software-defined network (SDN) enabled network, a method comprising:
   receiving at an end-user computing device an end-user request for a bandwidth-on-demand (BoD) service level;
   transmitting the end-user request to a SDN controller in the SDN enabled network;
   mapping at an OpenFlow controller coupled to the SDN controller the requested BoD service level to an optimal path through the SDN enabled network responsive to the end-user request; and
   provisioning at the OpenFlow controller the optimal path through the SDN enabled network.

2. The method of claim 1, wherein mapping at the OpenFlow controller the requested BoD service level to the optimal path through the SDN enabled network responsive to the end-user request further comprises mapping at the OpenFlow controller the requested BoD service level to an optimal route queue.

3. The method of claim 1, further comprising reserving at the SDN controller an amount of bandwidth for a period of time in the future if the end-user request for the BoD service level indicates the request for BoD service is for the period of time in the future.

4. The method of claim 3, wherein receiving an end-user request for the BoD service level further comprises receiving a source end point identifying the end-user computing device and a destination end point identifying a destination computing device between which an end-to-end connection service is to be established through the SDN enabled network.

5. The method of claim 2, wherein a network switch in the SDN enabled network operates according to a network operating system that supports a plurality of hardware queues per input/output port on the switch, each queue assigned a different minimum bandwidth level, and wherein mapping at an OpenFlow controller coupled to the SDN controller the requested BoD service level to the optimal path and the optimal route queue through the SDN enabled network responsive to the end-user request comprises selecting one of the plurality of hardware queues for the port on the switch that is assigned a minimum bandwidth level that satisfies the BoD service request.

6. The method of claim 5, further comprising provisioning at the OpenFlow controller the optimal route queue through the SDN enabled network.

7. The method of claim 1, wherein receiving an end-user request for the BoD service level comprises receiving a first value indicating a requested one of a plurality of possible BoD service levels, and a second value indicating a time duration for which to request the one of the plurality of possible BoD service levels.

* * * * *